United States Patent [19]

Waddill et al.

[11] 4,454,297
[45] Jun. 12, 1984

[54] 2-[2-AMINOETHOXY-2-ETHYLAMINO]ALK-ANOL AS AN EPOXY CURING AGENT

[75] Inventors: Harold G. Waddill; Robert L. Zimmerman, both of Austin, Tex.

[73] Assignee: Texaco Inc., White Plains, N.Y.

[21] Appl. No.: 458,225

[22] Filed: Jan. 14, 1983

[51] Int. Cl.³ .............................................. C08G 59/64
[52] U.S. Cl. .................................... 528/111; 525/504; 528/361; 528/407; 564/508
[58] Field of Search ...................... 528/111, 407, 361; 525/504; 564/508

[56] References Cited

U.S. PATENT DOCUMENTS 2,901,461  8/1959  Auerbach et al. .................. 528/111
3,262,912  7/1966  Wilken ................................ 528/111
3,420,828  1/1969  Muhlbauer ...................... 564/478 X
4,338,408  7/1982  Zimmerman et al. ............ 528/75 X
4,352,920  10/1982 Kluger ................................ 528/111

Primary Examiner—Earl A. Nielsen
Attorney, Agent, or Firm—Robert A. Kulason; Jack H. Park; Richard A. Morgan

[57] ABSTRACT

Bis(aminoethyl) ether is reacted with an alkylene oxide to form a 2-[2-aminoethoxy-2-ethylamino]alkanol which is useful as an epoxy curative.

The curative is cured with a polyepoxide to form an epoxy resin useful for such applications as decorative coatings, encapsulations, adhesives, laminates, potting compounds, etc.

2 Claims, No Drawings

2-[2-AMINOETHOXY-2-ETHYLAMINO]ALKANOL AS AN EPOXY CURING AGENT

BACKGROUND OF THE INVENTION

1. Field of the Invention

This invention relates to curable epoxy resins. More particularly it relates to 2-[2-aminoethoxy-2-ethylamino]alkanols as curative agents.

2. Description of the Prior Art

Epoxy resins constitute a broad class of polymeric materials having a wide range of physical characteristics. The resins are characterized by epoxide groups which are cured by reaction with certain catalysts or curing agents to provide cured epoxy resin compositions with certain desirable properties. Conventional curing agents include such compounds as polyamines, polycarboxylic acids, anhydrides and Lewis acids.

U.S. Pat. Nos. 3,420,828 and 4,338,408 describe the synthesis of bis(aminoethyl) ether derivatives such as 2-[2-aminoethoxy-2-ethylamino]ethanol.

SUMMARY OF THE INVENTION

The invention relates to an epoxy resin composition which comprises a polyepoxide and a curative agent of the formula:

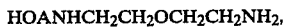
HOANHCH$_2$CH$_2$OCH$_2$CH$_2$NH$_2$, wherein A is an alkyl of 2 to 4 carbon atoms.

The resin when cured is useful for such applications as decorative coatings, encapsulations, adhesives, laminates, potting compounds, etc.

DESCRIPTION OF THE PREFERRED EMBODIMENTS

Part A of the two part composition of the present invention comprises an epoxy base resin typically a polyepoxide. Generally, the epoxy base resin is a vicinal polyepoxide containing compound having an average of at least 1.8 reactive 1,2-epoxy groups per molecule. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, aromatic halogen atoms and the like.

Preferred polyepoxides are those of glycidyl ethers prepared by epoxidizing the corresponding alkyl ethers or reacting, by known procedures, a molar excess of epichlorohydrin and an aromatic polyhydroxy compound, i.e., isopropylidene bisphenol, novolac, resorcinol, derivatives of aromatic amines, etc. The epoxy derivatives of methylene or isopropylidene bisphenols are especially preferred. The condensation product of epichlorohydrin with bisphenol A is particularly preferred.

A widely used class of polyepoxides which are useful according to the present invention includes the resinous epoxy polyethers obtained by reacting an epihalohydrin, such as epichlorohydrin, and the like, with either a polyhydric phenol or a polyhydric alcohol. Typically the epoxy resins have an average of at least 1.8 reactive, 1,2-epoxy groups per molecule. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylpropylphenylmethane, 4,4-dihydroxydiphenylbutylphenylmethane, 2,2'-dihydroxydiphenylditolylmethane, 4,4'-dihydroxydiphenyltolylmethylmethane and the like. Other polyhydric phenols which may also be co-reacted with an epihalohydrin to provide these epoxy polyethers are such compounds as resorcinol, hydroquinone, substituted hydroquinones, e.g., methylhydroquinone, and the like.

Among the polyhydric alcohols which can be co-reacted with an epihalohydrin to provide these resinous epoxy polyethers are such compounds as ethylene glycol, propylene glycols, butylene glycols, pentane diols, bis-(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-,3,3'-tetrahydroxydipropylsulfide and the like, mercapto alcohols such as monothioglycerol, dithioglycerol and the like, polyhydric alcohol partial esters, such as monostearin, pentaerythritol monoacetate and the like, and halogenated polyhydric alcohols such as the monochlorohydrins of glycerol, sorbitol, pentaerythritol and the like.

Another class of polymeric polyepoxides which can be amine cured and are in accordance with the present invention includes the epoxy novolac resins obtained by reacting, preferably in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., *Handbook of Epoxy Resins*, McGraw Hill Book Co., New York, 1967.

It will be appreciated by those skilled in the art that the polyepoxide compositions which are useful according to the practice of the present invention are not limited to those containing the above described polyepoxides, but that these polyepoxides are to be considered merely as being representative of the class of polyepoxides as a whole.

Part B of the two part composition of the present invention comprises a novel curative agent and optionally an accelerator. The epoxy resin curative agent of the present invention is of the formula:

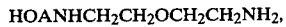
HOANHCH$_2$CH$_2$OCH$_2$CH$_2$NH$_2$, wherein A is an alkyl of two, three or four carbon atoms. In the Example is shown a synthesis wherein A is an alkyl of two carbon atoms.

The synthesis of these curative agents is described in U.S. Pat. Nos. 3,420,828 and 4,338,408 which are incorporated herein in their entirety by reference.

Generally, the reaction proceeds as follows. Bis-(aminoethyl)ether of the formula H$_2$NCH$_2$CH$_2$OCH$_2$CH$_2$NH$_2$ is reacted with an alkylene oxide of the formula

OCH$_2$CHR in accordance with the method of U.S. Pat. No. 3,420,828 wherein R is hydrogen or lower alkyl or mixtures thereof to produce a compound of the formula:

HOANHCH$_2$CH$_2$OCH$_2$CH$_2$NH$_2$, wherein A is an alkyl of from 2 to 4 carbon atoms.

The reaction of this invention should be conducted at an elevated temperature. The alkoxylation is preferably conducted in the temperature range from about 50° C. to 150° C. The curative can be separated from the other products by distillation. The starting materials are limited to bis(aminoethyl)ether, alkylene oxide and mixtures of alkylene oxides. The preparation of the unique compounds of this invention is further illustrated by the Example.

The present invention also relates to a process for forming an epoxy resin comprising contacting a polyepoxide with a curative agent, the improvement consisting of contacting a curative agent of the formula:

HOANHCH$_2$CH$_2$OCH$_2$CH$_2$NH$_2$, wherein A is an alkyl of from 2 to 4 carbon atoms. A can be an ethyl, propyl, or butyl alkyl or the process may utilize a mixture thereof. By this process a superior series of epoxy resins is produced which finds use in such applications as decorative coatings, encapsulations, adhesives, laminates, potting compounds, etc. The cured epoxy resin is noted for rapid curing and outstanding properties of flexibility impact strength and adhesion as shown in the Example.

In the process of the present invention, the curative agent and optionally an accelerator are mixed to form a compatible solution. The epoxy base resin is added and the components thoroughly contacted by mixing until a homogeneous mixture is obtained.

The curative agent is usually added to the formulation in such an amount that there is one reactive hydrogen atom in the curing component for each epoxy group in the epoxy resin component. These are known as stoichiometric quantities. The stoichiometric quantity can be calculated from the knowledge of the chemical structure and analytical data on the component. Stoichiometry unfortunately is not always calculable. For systems of the present invention, the proper amount of curative is the amount necessary to provide the best desired properties. This amount must be determined experimentally and can be accomplished by routine procedures known in the art. Generally the number of equivalents of reactive curative groups is from about 0.8 to 1.2 times the number of epoxide equivalents present in the curable epoxy resin composition, with from 0.9 to a stoichiometric amount being preferred. The exact amount of constituents in accordance with the above general requirements will depend, as mentioned, primarily on the application for which the cured resin is intended.

For many applications, curing may be accomplished at ambient conditions. For development of optimum achievable properties, however, curing at elevated temperature is necessary. The curing temperature range acceptable in this invention is from about 120° C. to about 180° C. for about 1 to 3 hours. Preferably curing is done at about 125° C. for 1 to 2 hours.

Optionally, the epoxy resin formulations of the present invention can include an accelerator to speed the amine cure of the epoxy resin. In several applications, an accelerator is beneficial, especially when an epoxy resin is used as an adhesive in flammable environment, thus making prolonged elevated temperature cure inconvenient or even hazardous. Lee, H. and Neville, K., *Handbook of Epoxy Resins*, pp. 7–14 describes the use of certain amine-containing compounds an epoxy curative agent-accelerators.

Many accelerators are known in the art which can be utilized in accordance with the instant invention. Examples include salts of phenols; salicylic acids; amine salts of fatty acids such as those disclosed in U.S. Pat. No. 2,681,901; and, tertiary amines such as those disclosed in U.S. Pat. No. 2,839,480. A preferred accelerator in accordance with the instant invention is disclosed in U.S. Pat. No. 3,875,072, G. Waddill. That accelerator comprises a combination of piperazine and an alkanol amine in a weight ratio of about 1:8 to 1:1. The above amount of accelerator is admixed with a polyoxyalkylene diamine curative agent in amount of from about 10 to 50 parts by weight accelerator to 100 parts by weight of the curing agent.

The following Examples are illustrative of the nature of the instant invention but are not intended to be limitative thereof.

EXAMPLE I-A

Preparation of 2-[2-aminoethoxy-2-ethylamino]ethanol

A by-product stream[1] from the manufacture of morpholine and 2-(2-aminoethoxy) ethanol which contained mostly methoxyethyl morpholine, bis(aminoethyl) ether and aminoethyl morpholine was reacted with ethylene oxide and the hydroxyethyl bis(aminoethyl) ether was isolated.

[1]Gas chromatographic analysis of by-product stream:

To a five gallon kettle were charged 17.40 lb. of the by-product stream. This was heated to 80° C. and 2.1 lbs. of ethylene oxide was added. The reactants were then digested at 90° C. for one hour followed by stripping at 3 mm. Hg vacuum and 125° C. This procedure removed 13.12 lb. of unreacted material. The 2[2-aminoethoxy-2-ethylamino]ethanol was then isolated by passing the mixture through a wiped-film evaporator at 0.1 mm. Hg vacuum and 180° C.

|  | Area Percent |
|---|---|
| Water | 6.0 |
| Morpholine | 1.4 |
| Methoxyethylmorpholine | 19.0 |
| Bis(aminoethyl) ether | 66.9 |
| Aminoethyl morpholine | 4.7 |
| Piperazine/monoethanolamine | 1.6 |

EXAMPLE I-B

Properties of epoxy resin cured with 2[2-aminoethoxy-2-ethylamino]ethanol

|  | 5417-20A |
|---|---|
| Formulation: | |
| Epoxy resin(EEW 188)[1] | 100 |
| 2-[2-aminoethoxy-2-ethylamino]ethanol | 24 |
| Brookfield viscosity, cps. 25° C. | 2400 |
| Gel time, mins. (20.0 g. mass) | 23.3 |
| Peak exotherm, °C. | 184.6 |
| Time to peak temperature, mins. | 31.5 |
| Properties of cured ⅛ in. casting[2]: | |
| Izod impact strength, ft.lbs/in. | 1.4 |

-continued

|  | 5417-20A |
|---|---|
| Tensile strength, psi | 9400 |
| Tensile modulus, psi | 435000 |
| Elongation at break, % | 4.1 |
| Flexural strength, psi | 15800 |
| Flexural modules, psi | 458000 |
| HDT, °C., 264 psi/66 psi | 60/65 |
| Shore D hardness, 0-10 sec. | 90-89 |

[1] Liquid diglycidyl ether of Bisphenol A
[2] Cured 2 hours 80°, 3 hours at 125° C.

EXAMPLE I-C

Thermal Shock Properties: Curing with 2-[aminothoxy-2-ethylamino]ethanol

| Formulation: | |
|---|---|
| Epoxy resin (EEW 188)[1] | 100 pbw. |
| 2-[2-aminoethoxy-2-ethylamino]ethanol | 24 pbw |

No. of samples cracked during cycle no.

| 1 | 2 | 3 | 4 | 5 | 6 | 7 | 8 | 9 | 10 | Total |
|---|---|---|---|---|---|---|---|---|---|---|
| 0 | 0 | 0 | 0 | 0 | 0 | 0 | 0 | 0 | 0 | 0 |

[1] Liquid diglycidyl ether of Bisphenol A. epoxy equivalent weight 188

Thermal cycle: oven at 140° C. (30 minutes), bath at −20° C. (15 mins) room temperature (15 mins). Examined for cracking and, if unchanged, recycled to oven.

Samples were 50 g encapsulations of common steel washer (1-in. o.d., ⅜-in. u.d., 1/16-in. thick) supported by ¼-in. ring of filter paper cut from Whatman 19×19 mm. cellulose extraction thimble. The encapsulations were formed in aluminum evaporating dishes (milk test; 5 cm. dia.×1 cm. deep).

EXAMPLE II

TABLE II-1

Analysis of Products Prepared with Variable Mole Ratio of Bis(amino) ethyl ether (BAEE) and Ethylene Oxide (EO)

| | Sample # | | | | |
|---|---|---|---|---|---|
| | #28 | #29 | #30 | #31 | #32 |
| Mole Ratio, BAEE/EO | 1/1 | 3/1 | 5/1 | 7/1 | 9/1 |
| Total amine, meq./g. | 13.3 | 16.4 | 17.3 | 17.5 | 17.8 |
| Tertiary amine, meq/g | 1.5 | 0.48 | 0.66 | 0.43 | 0.32 |
| Secondary amine, meq/g | 4.17 | 3.7 | 1.5 | 1.18 | 1.42 |
| Primary amine, meq/g | 7.63 | 12.18 | 15.18 | 15.89 | 16.06 |
| Hydroxyl No. | 1103 | 1124 | 1122 | 1151 | 1158 |
| Gas Chromatographic Analysis (area %) | | | | | |
| Bis(amino ethyl)ether | 16.6 | 48.4 | 61.7 | 68.9 | 72.9 |
| Aminoethylmorpholine | — | — | — | — | — |
| Unknown | 1.0 | 0.8 | — | — | — |
| Unknown | 0.9 | 1.9 | 2.3 | 2.4 | 2.5 |
| Methoxyethylmorpholine | — | 0.6 | 1.6 | 1.6 | 1.7 |
| Hydroxyethyl BAEE | 38.2 | 37.0 | 28.5 | 23.7 | 20.1 |
| Bis(Hydroxyethyl) BAEE (total) | 34.3 | 9.4 | 4.3 | 0.6 | 0.8 |
| Unknowns | 7.3 | — | — | — | — |
| Epoxy equivalent weight | 47.7 | 34.96 | 30.7 | 29.97 | 29.6 |

TABLE II-2

Properties of Epoxy Resin Cured with Hydroxyethyl BAEE Samples

| | E | D | C | B | A |
|---|---|---|---|---|---|
| Formulation: | | | | | |
| EPON ® 828[4] | 100 | 100 | 100 | 100 | 100 |
| Hydroxyethyl BAEE[1] Mole Ratio BAEE/EO: | | | | | |
| 9/1 (Sample #32) | 16 | — | — | — | — |
| 7/1 (Sample #31) | — | 16 | — | — | — |
| 5/1 (Sample #30) | — | — | 16 | — | — |
| 3/1 (Sample #29) | — | — | — | 18 | — |
| 3/1 (Sample #28) | — | — | — | — | 26 |
| Brookfield viscosity, cps., 25° C. | 600 | 600 | 600 | 750 | 1400 |
| Gel time, mins. (200 g. mass) | 25.4 | 25.8 | 25.6 | 23.4 | 18.5 |
| Peak exothermic temp. °C. | 262.0 | 256.2 | 254.8 | 252.5 | 229.7 |
| Time to peak temperature, mins. | 30.0 | 29.0 | 28.0 | 26.5 | 20.5 |
| Properties of Cured ⅛in. Castings: | | | | | |
| Izod impact strength, ft. lbs/in. | 0.13 | 0.19 | 0.19 | 0.22 | 0.23 |
| Tensile strength, psi | 9250 | 7700 | 9200 | 8800 | 8800 |
| Tensile modulus, psi | 347000 | 350000 | 379000 | 376000 | 411000 |
| Elongation at break, % | 7.6 | 7.4 | 8.8 | 6.2 | 5.0 |
| Flexural strength, psi | 14200 | 14600 | 14700 | 14300 | 13850 |
| Flexural modulus, psi | 376000 | 368000 | 383500 | 379000 | 411000 |
| HDT, ° C., 264 psi/66 psi | 93/97.6 | 94/97.5 | 89/95 | 87/91.5 | 66.5/69 |
| Shore D hardness 0-10 sec. | 77-75 | 78-75 | 78-75 | 76-74 | 79-75 |
| Adhesive Properties: | | | | | |
| Tensile shear strength, psi | 3400 | 2700 | 3100 | 3250 | 4100 |
| T-peel strength, pli. | 2,3 | 2.3 | 2.2 | 2.9 | 3.8 |

[1] For analyses, see Table II-1
[2] Cured 2 hours 80° C., 3 hours 125° C.
[3] Cured 1 hour at 125° C.
[4] Shell Chem. Co.-diglycidylether of Bisphenol A liquid resin, epoxy equivalent weight 185-190

TABLE II-3

Properties of Epoxy Resin Cured with Hydroxypropyl Bis (Aminoethyl) Ether

| Formulation | 5705-71 |
|---|---|
| EPON ® 828 | 100 |
| Hydroxypropyl BAEE[1] | 34 |
| Properties of Cured ⅛ in Casting:[2] | |
| Flexural strength, psi | 15970 |
| Flexural modulus, psi | 449400 |
| HDT, °C., 264 psi/66 psi | 60/62 |
| Shore D hardness | 78-75 |
| [1] Analysis: | |
| Total amine | 11.4 meq/g |
| Tertiary amine | 1.04 meq/g |
| Primary amine | 4.73 meq/g |
| Total acetylatables | 17.98 meq/g |
| Gas Chromatogram | Area % |
| Bis(aminoethyl) ether | 2.8 |
| Bis(aminoethyl)ether-1-propylene oxide adduct | 68.5 |
| Bis(aminoethyl)ether-2-propylene oxide adduct | 11.2 |
| Unknowns (8 peaks) | 17.5 |

[2] Cured 2 hours, 80° C., 3 hours, 125° C.,

| SUMMARY OF TEST METHODS |
|---|
| Tensile shear strength, psi (ASTM Standard Test Method D-1002) |
| T-peel strength, pli (ASTM Standard Test Method D-1876) |
| Izod impact strength, ft-lb/in (ASTM Test D-256) |
| Tensile strength, psi (ASTM Test D-638) |
| Tensile modulus, psi (ASTM Test D-638) |

| SUMMARY OF TEST METHODS |
| --- |
| Elongation of Break, % (ASTM Test D-638) |
| Flexural strength, psi (ASTM Test D-750) |
| Flexural modulus, psi (ASTM Test D-790) |
| HDT, °C, 264 psi/66 psi (ASTM Test D-648) |
| Shore D hardness, 0–10 sec (ASTM Test D-2240) |
| Gel time (Gardco Gel Timer; Paul N. Gardner Co.) |

The principle of the invention and the best mode contemplated for applying that principle have been described. It is to be understood that the foregoing is illustrative only and that other means and techniques can be employed without departing from the true scope of the invention defined in the following claims:

What is claimed is:

1. An epoxy resin composition comprising
   (A) a diglycidyl ether of Bisphenol A of epoxy equivalent weight 185 to 190, and
   (B) a curing amount of curing agent of the formula:

$HOCH_2CH_2NHCH_2CH_2OCH_2CH_2NH_2.$

2. An epoxy resin composition comprising
   (A) a diglycidyl ether of Bisphenol A of epoxy equivalent weight 185 to 190, and
   (B) a curing amount of curing agent of the formula:

$HOCH_2CH_2CH_2NHCH_2CH_2OCH_2CH_2NH_2.$

* * * * *